J. A. MILLER.
PIPE CONNECTION.
APPLICATION FILED NOV. 20, 1906.

919,913.

Patented Apr. 27, 1909.
2 SHEETS—SHEET 1.

Witnesses:
J. L. Lawlor.
H. F. Rueth.

Inventor:
James Acton Miller
By George L. Barnes.
Atty.

J. A. MILLER.
PIPE CONNECTION.
APPLICATION FILED NOV. 20, 1906.

919,913.

Patented Apr. 27, 1909.
2 SHEETS—SHEET 2.

Witnesses
J. L. Lawlor
H. F. Rueth

Inventor
James Acton Miller
By George L. Barnes
Attorney

UNITED STATES PATENT OFFICE.

JAMES ACTON MILLER, OF THOMPSONVILLE, CONNECTICUT.

PIPE CONNECTION.

No. 919,913.  Specification of Letters Patent.  Patented April 27, 1909.

Application filed November 20, 1906. Serial No. 344,204.

*To all whom it may concern:*

Be it known that I, JAMES ACTON MILLER, a citizen of the United States, and resident of Thompsonville, in the county of Hartford and State of Connecticut, have invented certain new and useful Improvements in Pipe Connections, of which the following is a full, clear, and exact specification.

My invention has for its object to provide a new connection for joining together pipes or tubes, or attaching them to fixed parts, also applicable to stuffing box construction.

The invention consists in a novel externally threaded divided gland and in the combination therewith of a receiving socket into which it is screwed and a flanged out pipe or tube clamped by the gland, and in the novel construction of parts as hereinafter more fully described and claimed.

Figure 1:
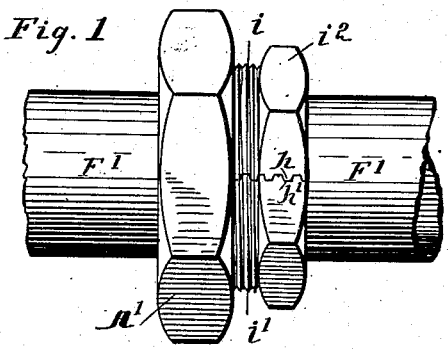
Figure 2:
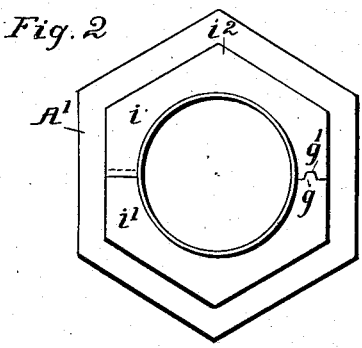
Figure 3:
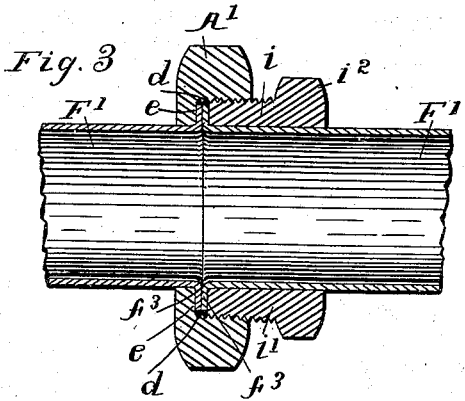
Figure 4:
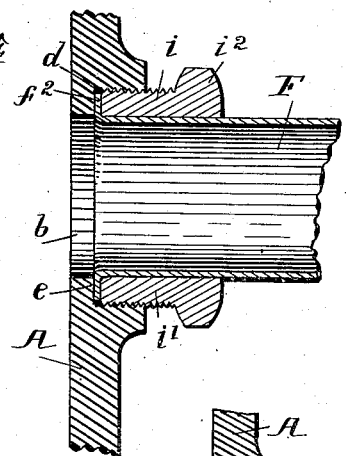
Figure 5:
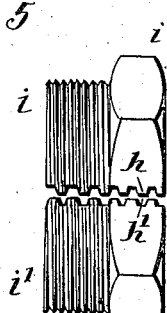
Figure 6:
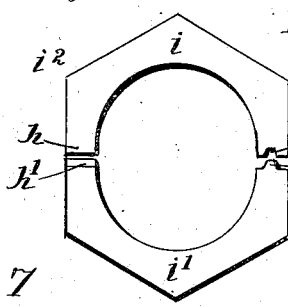
Figure 8:
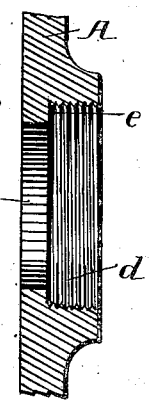
Figure 7:
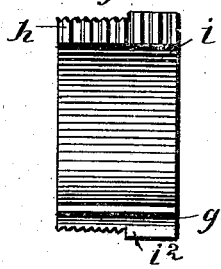
Figure 9:
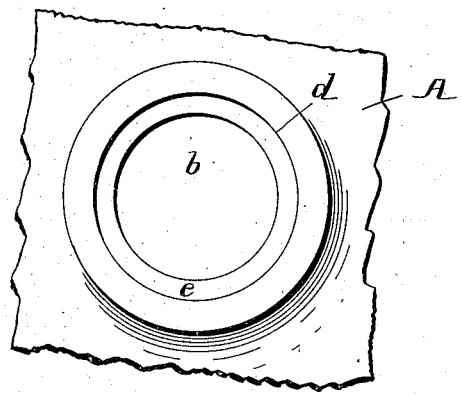
Figure 10:
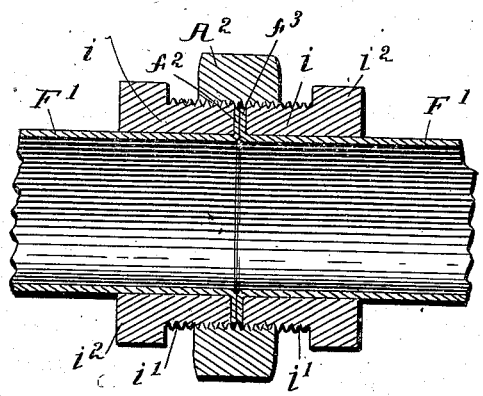
Figure 11:
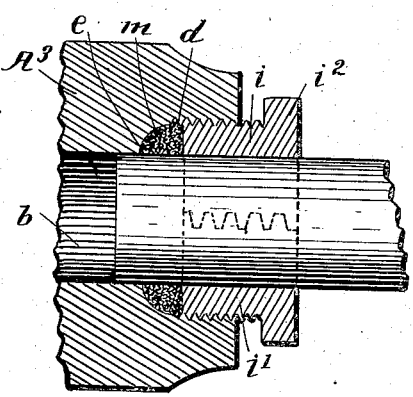

In the accompanying drawings forming a part of this specification: Figure 1 is a side view of a pipe union of my improved construction or device for connecting two pipes or tubes, and Fig. 2 is an end view of the same. Fig. 3 is a central vertical longitudinal section through Fig. 1. Fig. 4 is a sectional view similar to Fig. 3 of the modified construction involved in the attachment of a pipe or tube to a stationary fixture. Fig. 5 is a side view of the divided gland with its parts separated, and Fig. 6 is an end view of the same. Fig. 7 is a view of the interior surface of one of the parts of the divided gland, showing its longitudinal tongue and groove and lateral notches in plan view. Fig. 8 is a sectional view similar to Fig. 4 of the receiving socket of said figure. Fig. 9 is a plan view of the same. Fig. 10 is a view corresponding to Fig. 1, showing a union of a more complex form than that of said figure. Fig. 11 is a modification of the construction without flanged pipe and applicable for use as a stuffing box.

Referring to the drawings, the simplest form of my improved pipe connection or that in which a pipe or tube is connected to a stationary part, as the steam chest of an engine, is shown to comprise the stationary part A, having an aperture $b$ and a screw threaded recess $d$ enlarged therefrom to provide an annular seat or shoulder $e$ around the aperture, and an externally threaded divided gland $i$ $i^1$ screwed into the recess and embracing a pipe or tube F having a flanged out end $f^2$ between the seat and the end of the ring, as viewed in cross section in Fig. 4.

The gland is provided with a flange $i^2$ which is of hexagonal perimeter, as shown in Figs. 2 and 6, or otherwise adapted for the application of a wrench to screw the gland into the recess of the stationary part. The gland may be divided into any required number of sections, but ordinarily preferably comprises two equal parts or halves $i$ and $i^1$, as shown in Figs. 2, 5, 6 and 7.

The two halves of the divided gland are held in proper relation to each other or with their respective screw threads coincident by means of the following construction. On one side of the gland, at the plane of the joint thereof, the respective halves are provided with a longitudinal intermeshing tongue $g$ and corresponding grooves $g^1$ which effectually prevent lateral play of the parts on each other. On the opposite side the sections are, respectively, provided with a series of transverse teeth $h$ and corresponding notches $h^1$ which, by being intermeshed together, prevent longitudinal motion of the parts relatively to each other. Thus fitted together, the parts of the gland may in operation be placed upon a pipe or tube and as readily entered and screwed into the recess $d$ of the part A as if made in one piece or solid ring. This tongue and groove and notched construction of the two halves of the gland may be dispensed with without departing from the spirit of my invention, but it will be seen that, when the halves are made plain and unconnected, great care will need to be exercised to locate them properly in assembling the parts. By unscrewing the gland from the recess its parts may be removed from the pipe and the pipe detached from the part A, or turned in its seat for the purpose of removal from another pipe or part.

The invention in the form in which it is adapted as a pipe union for coupling two pipes or tubes together is shown particularly in Figs. 1 to 3, inclusive. In this modification the element which corresponds to the stationary part A comprises a collar or socket $A^1$ otherwise of the construction involved in said part A, that is, having an aperture and threaded recess enlarged therefrom providing an annular shoulder or seat around the aperture at the bottom of the recess. The socket is of hexagonal perimeter or otherwise adapted for the application of a wrench, and it embraces one of the pipes $F^1$ which are to be coupled together, and which is provided with an external flange $f^3$ adapted to impinge upon the seat or shoulder e of the part A¹. The divided gland embraces the other of the two pipes precisely as in the construction first described and is screwed into the recess d of the socket with the flanges of both pipes clamped together between the end and the annular shoulder e of the socket.

In the form of union above described, the socket A¹ requires to be placed upon the pipe before making up the line of piping, and it cannot then be removed therefrom without detaching the opposite end of the pipe from the part to which it is connected. It is desirable in some instances that all the elements of the union shall be removable from the pipes and this result may readily be accomplished by forming the seat at the bottom of the socket by means of a divided gland screwed into the collar from that end, as shown in the construction illustrated in Fig. 10. The collar A² in such case is of a substantially uniform diameter throughout of sufficient size to receive the flanges f² f³ of the pipes F¹ and internally screw threaded from each end. A divided gland i i¹ is then screwed into each end of the collar, thus clamping the flanges of the pipes between them. When the divided glands are removed, the collar may be disconnected from the pipes by forcing their ends apart sufficiently to pass it between them.

In the form of the invention adapted for connecting a pipe or tube with an engine or a tank or other receptacle, a modification may be employed which operates essentially as an expansion joint. In this construction, which is shown in Fig. 11, the pipe H is not provided with a flange at its end, but is left straight, and projected into the aperture b in the tank or fixed part A³ for some distance beyond the bottom of the recess d or shoulder thereof. The divided gland i i¹ is placed upon the pipe in the manner hereinbefore described, but a suitable ring of elastic packing m is placed between its end and the shoulder e in the recess d and firmly compressed upon the pipe by being clamped between the parts. This construction also provides an excellent union which allows expansion and contraction of the line of piping.

The flexible feature referred to in the expansion joint above described adapts this construction for general stuffing box use, as it will readily be perceived that it is but a stuffing box with a divided gland.

I claim as my invention:

In pipe connections, the combination of a socket and a longitudinally divided gland having its respective parts provided with longitudinal interlocking shoulders or engaging surfaces on their meeting edges at one side of the axis and transverse interlocking serrations at their meeting edges on the opposite side, whereby both transverse and lengthwise displacement of the parts relative to each other is prevented.

Signed by me at Thompsonville Conn. this 13th day of November 1906.

JAMES ACTON MILLER.

Witnesses:
ARTHUR H. CLARK,
GEORGE MADDOCK.